United States Patent
Fujii et al.

(10) Patent No.: US 8,152,678 B2
(45) Date of Patent: Apr. 10, 2012

(54) HYBRID DIFFERENTIAL GEAR DEVICE, DIFFERENTIAL CASE THEREFOR AND ASSEMBLING METHOD OF DIFFERENTIAL CASE

(75) Inventors: Noriyuki Fujii, Woluwe-Saint-Lambert (BE); Makoto Nishiji, Woluwe-Saint-Lambert (BE)

(73) Assignee: JTEKT Corporation, Osaka-shi (JP)

( * ) Notice: Subject to any disclaimer, the term of this patent is extended or adjusted under 35 U.S.C. 154(b) by 1003 days.

(21) Appl. No.: 12/021,676

(22) Filed: Jan. 29, 2008

(65) Prior Publication Data

US 2008/0254930 A1  Oct. 16, 2008

(30) Foreign Application Priority Data

Jan. 30, 2007 (JP) ................. 2007-019678
Jan. 30, 2007 (JP) ................. 2007-019679

(51) Int. Cl.
*F16H 48/06* (2006.01)
(52) U.S. Cl. ......................................................... 475/221
(58) Field of Classification Search .................... 475/221
See application file for complete search history.

(56) References Cited

U.S. PATENT DOCUMENTS 5,782,717 A  7/1998 Smothers et al.
6,729,991 B1  5/2004 Nishiji et al.
6,827,662 B2  12/2004 Nishiji
2003/0045391 A1* 3/2003 Nishiji et al. ................. 475/221
2003/0078131 A1  4/2003 Nishiji

FOREIGN PATENT DOCUMENTS

JP  64-36224 U  3/1989
JP  2003-130178  5/2003
JP  2004-324735  11/2004
JP  2004-347012  12/2004

OTHER PUBLICATIONS

Partial European Search Report issued Oct. 25, 2010, in Patent Application No. 08150785.7.

* cited by examiner

*Primary Examiner* — David D Le
*Assistant Examiner* — Erin D Bishop
(74) *Attorney, Agent, or Firm* — Oblon, Spivak, McClelland, Maier & Neustadt, L.L.P.

(57) ABSTRACT

It is an object of the present invention to provide a hybrid differential gear device achieving the small and light devices as a whole and easy assembling of a differential case.
A hybrid differential gear device has a first differential gear mechanism 2 and a second differential gear mechanism 3. The first differential gear mechanism 2 has a plurality of planetary gears 5 as an input element, a sun gear 6 engaging with the plural planetary gears 5 as a first output element, and an internal gear engaging with the plural planetary gears 5 as a second output element. The second differential gear mechanism 3 has side gears 14R, 14L connected respectively to a right and a left front tire wheel, pinion gears 12, 13 engaging with the side gears 14R, 14L, and a pinion gear shaft 15 supporting rotatably the pinion gears 12, 13. The pinion gear shaft 15 is supported non-rotatably and movably to a direction of a rotational axis of a differential case 4.

16 Claims, 10 Drawing Sheets

HYBRID DIFFERENTIAL GEAR DEVICE, DIFFERENTIAL CASE THEREFOR AND ASSEMBLING METHOD OF DIFFERENTIAL CASE

INCORPORATION BY REFERENCE

The present application claims priority under 35 U.S.C. §119 to Japanese Patent Applications No. 2007-019678, filed on Jan. 30, 2007 and No. 2007-019679, filed on Jan. 30, 2007. The contents of these applications are incorporated herein by reference in their entirety.

BACKGROUND OF THE INVENTION

1. Field of the Invention

The present invention relates to a hybrid differential gear device, differential case therefor and an assembling method of the differential case, and more particularly relates to a hybrid differential gear device, differential case therefor and an assembling method of the differential case having a pinion shaft rotatably supported a pinion gear engaging with a side gear.

2. Description of the Related Art

It is well known for a prior hybrid differential gear device having two differential gear mechanism installed in parallel to a direction of a tire shaft axis as disclosed in a published patent document; Tokkai 2003-130178, especially in FIG. 4 thereof. It is also well known for a prior hybrid differential gear device distributing torque input from a ring gear, mounted on a peripheral surface of a differential case, into two driving shafts as disclosed in a published patent document; Tokkai 2004-347012.

The prior differential gear device disclosed in the Tokkai 2003-130178 provides a first differential gear mechanism as a center differential gear mechanism of a planetary gear type differential gear mechanism, a second differential gear mechanism as a front differential gear mechanism of a bevel gear type differential gear mechanism, and a differential case installing the first and the second differential gear mechanisms.

The first differential gear mechanism has a planetary gear as a first input element, a sun gear as a first output element engaging with the planetary gear, and an internal gear as a second output element engaging with the planetary gear on an axis same to an axis of the sun gear. The second differential gear mechanism has a pinion shaft supported by the internal gear, a pair of pinion gears as a second input element supported rotatably on the pinion gears, and a pair of side gears as a third output element and a forth output element engaging with the one pair of pinion gears. The differential case is formed by a case body having a first ring gear mounting flange, and a cap having a second ring gear mounting flange.

The planetary gear rotates by receiving a rotational force of the differential case to transmit this rotational force to the sun gear and the internal gear. The sun gear rotates by receiving the rotational force of the planetary gear to transmit this rotational force to a rear tire shaft as an output shaft. The internal gear rotates by receiving the rotational force of the planetary gear to transmit the rotational force to the pinion gear shaft.

The pinion gear shaft rotates by receiving the rotational force of the differential case to transmit this rotational force to the one pair of pinion gears. The one pair of pinion gears rotates by themselves or in planetary rotation by receiving the rotational force of the pinion gear shaft or the internal gear to transmit this rotational force to the one pair of side gears. The one pair of side gears rotate by receiving the rotational force of the one pair of pinion gears to transmit this rotational force to a right and a left front tire wheel shafts.

The differential case rotates by receiving torque from the ring gear in an engine side of a vehicle to transmit this rotational force to the planetary gear.

In this construction of the prior hybrid differential gear device, the torque from the engine is input into the differential case to rotate the differential case around a rotational axis. Upon the rotation of the differential case, the rotational force is transmitted to the planetary gear and to the internal gear and the sun gear through the planetary gear. Thereby, the internal gear and the sun gear are rotated to transmit the rotational force to the one pair of pinion gears through the pinion gear. Therefore, the one pair of pinion gear is rotated by themselves or in planetary rotation to transmit this rotational force to the one pair of side gears.

In this state, since the output shaft is engaged with the sun gear and the right and left front tire wheel shafts are engaged with the one pair of side gears, the torque from the engine is transmitted to the output gear through the differential case and the planetary gear and the internal gear of the first differential gear mechanism and then transmitted to the right and left front tire wheel shafts through the differential case, the planetary gear and the internal gear of the first differential gear mechanism and the pinion gear and the side gears of the second differential gear mechanism.

In this prior hybrid differential gear device, by the way, a position of the pinion shaft in a direction of an axis of the tire wheel shaft, that is a direction of the rotational axis, depends on a position of the internal gear in the rotational axis direction because the pinion gear shaft is supported by the internal gear. Therefore, where the internal gear the planetary gear and the sun gear are consisted of a helical gear, the rotational force of the differential case is transmitted to the planetary gear to generate thrust force in the planetary gear and the sun gear so that the internal gear and the sun gear are moved to approach each other along the rotational axis of the differential case, thereby to move the pinion gear shaft to the sun gear side with the internal gear. In this instance, the side gear in the sun gear side receives load from the pinion gear shaft through the pinion gear and also receives the thrust force generated in the sun gear so that it intends to destroy a stable performance of the engagement between the pinion gear and the side gear and to reduce durability. Therefore, a wall is mounted on the differential case between the sun gear and the side gear in order to receive the thrust force generated on the sun gear to prevent the thrust force from being received by the side gear in the sun gear side to make the stable performance and to prevent the durability from reducing.

However, the prior hybrid differential gear device is constructed with the wall between the sun gear and the side gear, thereby to make a size of the differential case to the rotational axis direction large and it creates the problem for the whole device to become large and heavy.

In another view point of an assembling method of the prior hybrid differential gear device disclosed in the Tokkai 2003-130178 or in the Tokkai 2004-347012, a mounting method of the ring gear to the differential case is performed by the step of inserting a ring gear mounting bolt into a bolt inserted hole mounted on a second ring gear mounting flange and into the ring gear, then screwing the ring gear mounting bolt into a bolt mounted hole installed in the first ring gear mounting flange of the case body.

In the prior hybrid differential gear device disclosed in the Tokkai 2004-347012, the planetary gear, the internal gear and the sun gear are constructed with the helical gear in order to create differential limiting force by pressing the planetary gear to the rotational axis direction in transmitting the torque. This pressing force acts to spread the differential case to a direction of the output shaft. And also in the prior hybrid differential gear device disclosed in the Tokkai 2003-130178, an another pressing force by the bevel gear type differential mechanism acts on the differential case to be spread to the direction of the output shaft in addition to the pressing force by the planetary gear type differential gear mechanism in same condition to the Tokkai 2004-347012. However, the differential case is constructed with two divided parts to be combined by a bolt at a mounting portion of the ring gear so that it is difficult to establish sufficient intensity of the flange and a combining force by the bolt. Therefore, in order to combine the two divided parts by bolt, it is needed that a width of the flange is large or a number of bolts is increased to establish the sufficient strength and combined force at the combined portion. As a result of that, it needs more weight and assembling time.

SUMMARY OF THE INVENTION

In view of the previously mentioned circumstances, it is an object of the present invention to provide a hybrid differential gear device, differential case therefore and an assembling method of the differential case that reduce the size of the differential case along the rotational axis to achieve the small and light device as a whole.

It is another object of the present invention to provide a hybrid differential gear device, differential case therefore and an assembling method of the differential case that takes a sufficient strength in a simple construction and achieves easy assembling method.

In order to achieve the above and other objects, one aspect of the present invention provides a hybrid differential gear device having mainly a pinion gear shaft supported non-rotatably and movably to a direction of a rotational axis of a differential case against one of output element of a first output element and a second output element, where an input element is one selected from the group of a planetary gear, an internal gear and a sun gear and the first output element and the second output element are the remaining two elements of the planetary gear, the internal gear and the sun gear. Thereby, the present invention can shorten the size of the differential case to the direction of the rotational axis to make the small and light device as a whole.

Second aspect of the present invention provides a differential case for a hybrid differential gear device having mainly a case body having a first tire wheel shaft inserted hole and a ring gear mounting flange, a cap inserted in press fitting into the case body and positioned to a direction of press fitting and around a rotational axis of the differential case, the cap has a second tire wheel shaft inserted hole and a ring bolt fixing the cap by positioning the cap in a direction opposite to the direction in press fitting, the ring bolt is screwed in engaging with the case body movably in advancing and retracting. Thereby, the present invention can achieve the sufficient strength in a simple construction.

Third aspect of the present invention provides an assembling method of a differential case for a hybrid differential gear device having the steps of positioning a cap having second tire wheel shaft inserted hole against a case body having a first tire wheel shaft inserted hole and a ring gear mounting flange to a direction of press fitting and around the rotational axis of the differential case by the way of inserting in press fitting the cap into the case body, and fixing the cap to a direction opposite to a direction of the inserting by the way of screwing the ring bolt into the case body. Thereby, the present invention can achieve the sufficient strength in a simple construction and the easy assembling to coincide each axis of both tire shaft inserted holes formed respectively in the divided differential case.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENTS

First Embodiment of the Present Invention

Figure 1:
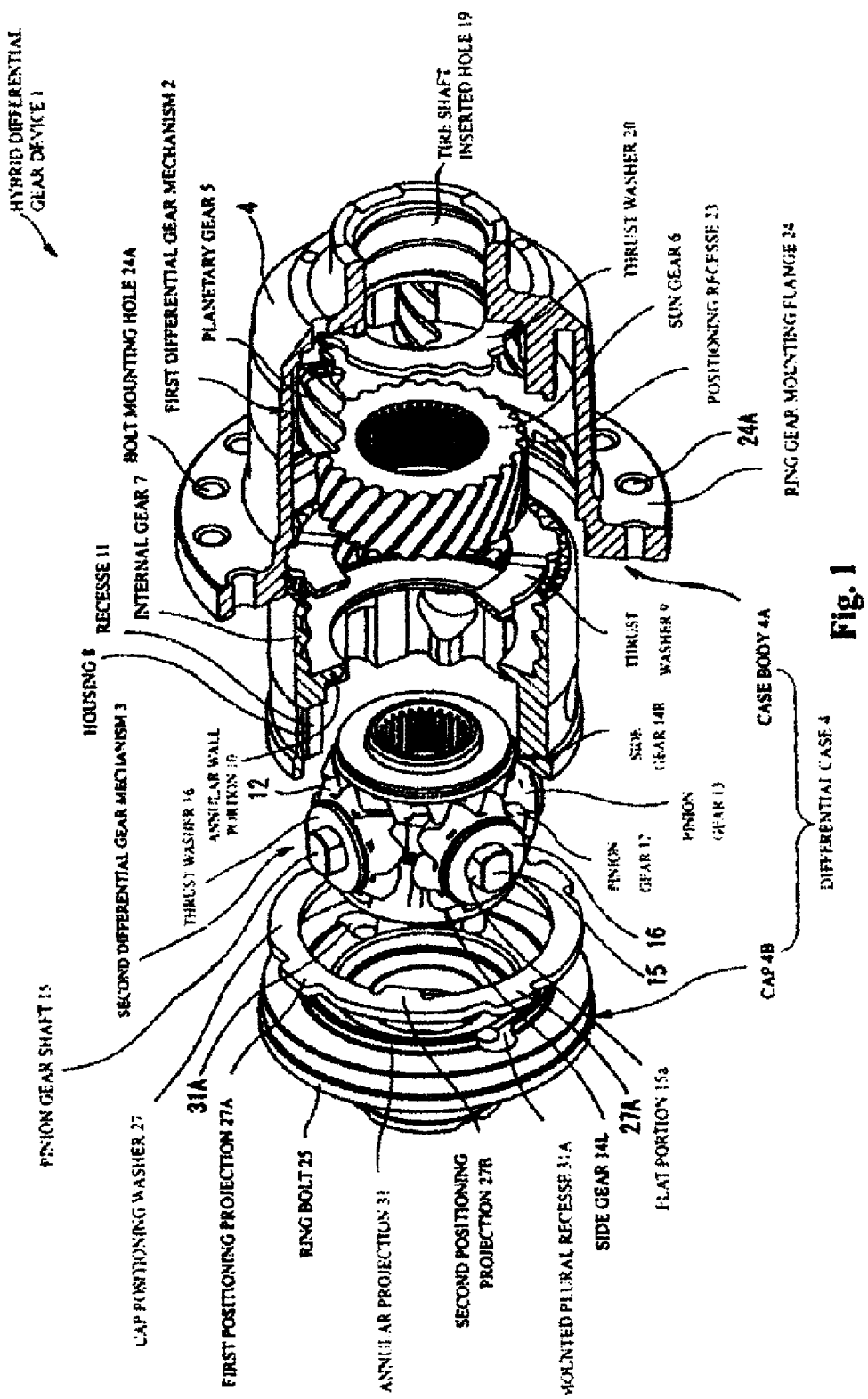
FIG. 1 is an oblique perspective diagram explaining a hybrid differential gear device according to one embodiment of the present invention.
Figure 2:
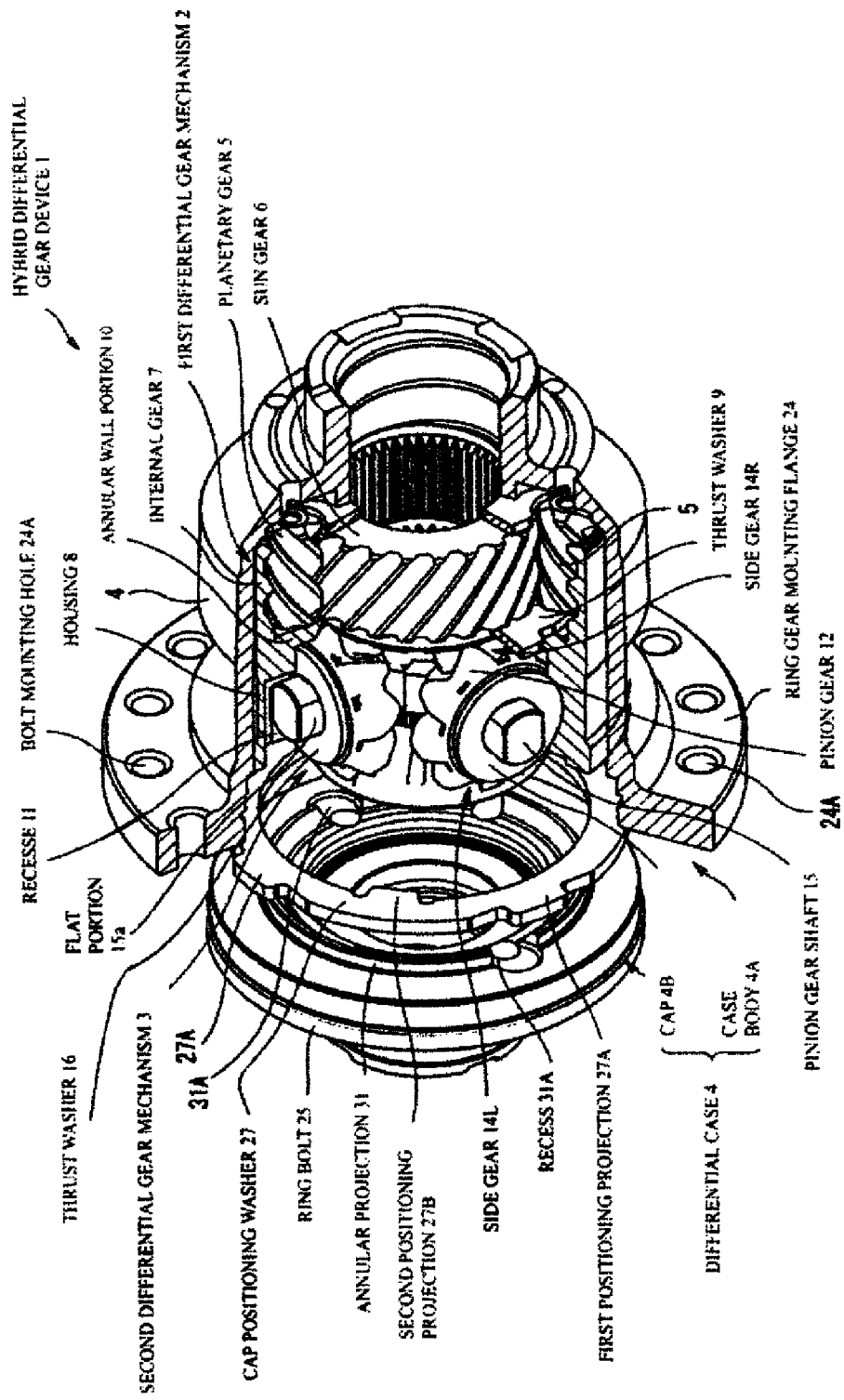
FIG. 2 is an oblique perspective diagram showing an engaging stage of gears of a hybrid differential gear device according to one embodiment of the present invention.
Figure 3:
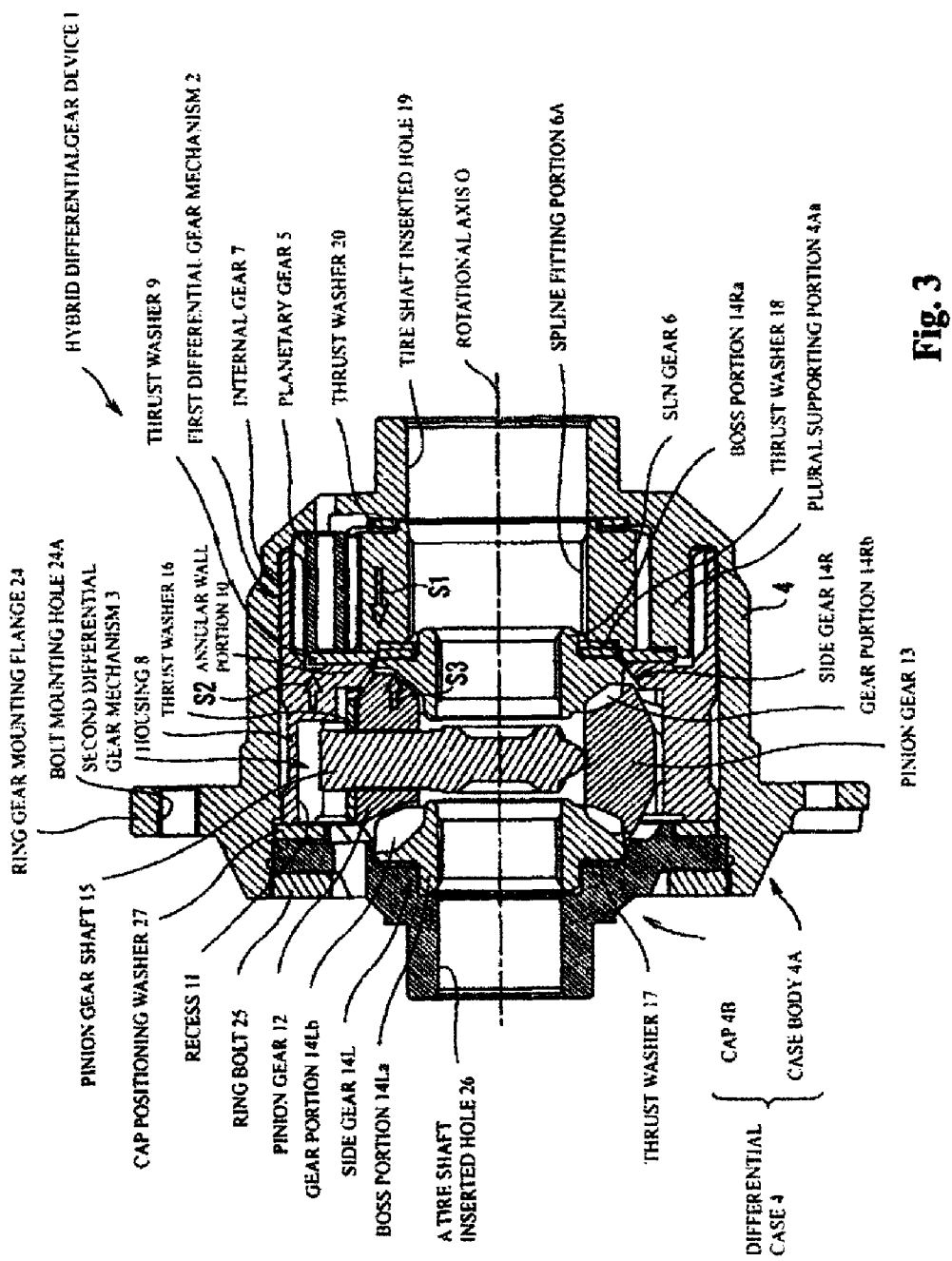
FIG. 3 is a cross sectional drawing explaining a hybrid differential gear device according to one embodiment of the present invention.

In FIG. 1 to FIG. 3, a numeral 1 shows the hybrid differential gear device for the vehicle. The hybrid differential gear device 1 mainly constitutes of first differential gear mechanism 2 consisting of a planetary gear type differential mechanism, second differential gear mechanism 3 consisting of bevel gear type differential mechanism and a differential case 4 containing the first differential gear mechanism 2 and the second differential gear mechanism 3.

As shown in FIG. 3, the first differential gear mechanism 2 has a plurality of planetary gears 5 as a first input member or a first input element a sun gear 6 as a first output member or a first output element engaging with the plural planetary gears 5, an internal gear 7 as a second output member or a second output element engaging with the plural planetary gears 5 on an axis of the sun gear 6. The first differential gear mechanism 2 is located in parallel with the second differential gear mechanism 3 on a rotational axis O of the differential case 4 to be constructed to distribute driving force from an engine to front wheels and rear wheels of a four wheel drive vehicle as a function of a center differential mechanism. These gears 5, 6, 7 are respectively consisted of a helical gear.

The plural planetary gears 5 are arranged between the sun gear 6 and the internal gear 7 and rotatably supported between plural supporting portions 4Aa (referred to FIG. 3) constructed with the differential case 4 as a body. The plural planetary gears 5 are constructed to move in orbital motion with the differential case 4.

The sun gear 6 is a hollow cylindrical body having its same axis with the rotational axis O of the differential case 4 and is rotatably mounted inward to the planetary gears 5. The sun gear 6 is arranged to be movably in its axial direction by receiving thrust force generated on a side gear of the second differential gear mechanism 3. On an inner surface of the sun gear 6 is formed a spline fitting portion 6A connecting movably with an unillustrated right front wheel shaft. Then, the sun gear 6 is constructed to receive a rotational force from the planetary gears 5 in order to output to an unillustrated rear wheel shaft through hollow cylindrical shaft etc.

The internal gear 7 is a hollow cylindrical body opening in both direction of the rotational axis O of the differential case 4 and is rotatably disposed between the planetary gears 5 and the differential case 4. The internal gear 7 is constructed to receive the rotational force from the planetary gears 5 to output to a pinion gear or a pinion gear shaft of the second differential gear mechanism 3. A hollow cylindrical housing 8 is formed in a side portion of the internal gear 7 facing to the second differential gear mechanism 3 in a body to receive the pinion gear etc. of the second differential gear mechanism 3. On an inner surface of the housing 8 is formed an annular wall portion, in a body, receiving the thrust force from the sun gear 6 through a thrust washer 9. Further plural recesses 11 are formed on the inner surface of the housing 8 to be opened in axial direction along the rotational axis O. A number of the plural recesses is four in this one embodiment.

The annular wall portion 10 is positioned on outer peripheral portion of one of a pair of side gears in a side of the sun gear 6 of the second differential gear mechanism 3. The plural recesses 11 are positioned in parallel each other spaced at predetermined angle of 90 degrees in outer peripheral direction. An each of inner opening of the plural recesses 11 is a flat surface in a side of rotational axis O and each of inside walls of the plural recesses 11 is formed a pair of flat surface to receive an end of the pinion gear shaft 15 described hereinafter.

The second differential gear mechanism 3 includes two pairs of pinion gears 12, 13 as the second input member, a pair of right and left side gears 14R, 14L as a third output member and a fourth output member engaging with said two pairs of pinion gears 12, 13, and a plurality of pinion gear shafts 15 supporting rotatably the two pairs of pinion gears 12, 13. FIG. 3 shows only one pair of pinion gears. A number of plural pinion gear shafts 15 is two in this embodiment so that one pinion gear 12 is supported rotatably by the pinion gear shaft 15 but the opposite pinion gear 13 is not supported by pinion gear shaft 15 and is only freely rotatable, that is the opposite pinion gear is a shaft-less type. However the number may be four, that is all of the plural pinion gears 12, 13 are rotatably supported by each of four pinion shafts 15. The second differential gear mechanism 3 is disposed on the rotational axis O of the differential case 4 between a cap 4B and the first differential gear mechanism 2. The second differential gear mechanism 3 has a function of a front differential mechanism and is constructed to distribute the driving force distributed by the first differential gear mechanism 2 to right and left front wheels of the four wheel drive vehicle.

The two pairs of the pinion gears 12, 13 are rotatably installed on the housing 8 through the pinion gear shafts 15 respectively to be placed in parallel along an axis perpendicular to the rotational axis O of the differential case 4. The two pairs of the pinion gears 12, 13 are constructed to receive torque in a side of the engine from the first differential gear mechanism 2 through the housing 8 and the pinion gear shafts 15 and to input the torque to the side gears 14R, 14L. A back face of the pinion gears 12, 13 is flat and a thrust washer 16 is inserted between the flat surface of the back face of the pinion gears 12, 13 and the flat surface of the inner opening of the recess 11.

Besides, where the back face of the pinion gears 12, 13 is spherical surface, one side of the washer 16 is spherical and the other is flat.

The side gears 14R, 14L consist of a bevel gear having boss portions 14Ra, 14La and gear portions 14Rb, 14Lb and the bevel gear is substantially cylindrical. The side gears 14R, 14L are supported in the differential case 4 rotatably around a tire shaft axis and movably to a direction of the tire shaft axis into a tire shaft inserted hole 26 of the cap 4B of the differential case 4 and in the sun gear 6. The thrust force S2, S3, shown in FIG. 3, are generated on the internal gear 7 and the right side gear 14R to act on the side of the sun gear 6 and a resultant force of the thrust force S2, S3 is set to be larger than thrust force S1, shown in FIG. 3, generated on the sun gear 6. The thrust force S1 is acted on the side of the right side gear 14R. Unillustrated right and left front tire shafts are respectively engaged in spline with the side gears 14R, 14L. A thrust washer 17 is inserted between a back face of the left side gear 14L and an annular opening side of the tire shaft inserted hole 26, and a thrust washer 18 is inserted between a back face of the right side gear 14R and opening side of the sun gear 6.

The pinion gear shafts 15 are installed in the housing 8 in the stage that a shaft end of the pinion gear shafts 15 is inserted into the corresponding recess 11 and the pinion gear shafts 15 are mounted non-rotatably against the housing 8 of the internal gear 7 and movably to the direction of the tire shaft axis. On opposite ends in circumferential direction of an end of the pinion shafts 5 is formed a pair of flat portions 15a (see FIG. 1) being symmetrical at its axis and parallel each other. The flat portions 15a is constructed to engage with the flat surface of the inside wall of the recesses 11 in order to allow the movement of the pinion gear shaft 15 to the direction of the tire shaft axis against the housing 8 of the internal gear 7. This movable distance of the pinion gear shaft 15 to the direction of the tire shaft axis against the internal gear 7 is set to be larger than the movable distance of the sun gear 6 to the direction of the tire shaft axis against the differential case 4 so that a center of the pinion gear shafts 15 is positioned in equal distance from the right side gear 14R and the left side gear 14R based on the half distance of its movement by the way of a full distance of the right side gear 14R based on thrust force S3 of the sun gear 6 in order to maintain an even engagement of between the pinion gears 12, 13 and the right side gear 14R and between the pinion gears 12, 13 and the left side gear 14L. Thereby, where the planetary gears 5 are rotated, i.e. where the differential case 4 is rotated so that the thrust force S1, S2 are generated on the sun gear 6 and the internal gear 7 to move the pinion gear shafts 15, i.e. pinion gears 12, 13 and the sun gear 6 to the right side gear 14R to push the right side gear 14R, the pinion gear shafts 15 are positioned in the middle between both side gears 14R and 14L along the tire shaft axis based on its self-alignment so that it reduces adverse effect based on engaging balance between the pinion gears 12, 13 and the side gears 14R, 14L.

The differential case 4 provides a case body 4A opening to one side and the cap 4B closing the opening portion of the case body 4A.

The case body 4A has a tire shaft inserted hole 19 opening along the rotational axis O and is constructed with a cylindrical body as a whole. In the tire shaft inserted hole 19 is inserted a hollow cylindrical shaft connecting to a rear tire shaft. A thrust washer 20 is mounted between a circumferential portion around the opening of the tire shaft inserted hole 19 and a back face of the right side gear 14R.

Figure 4:
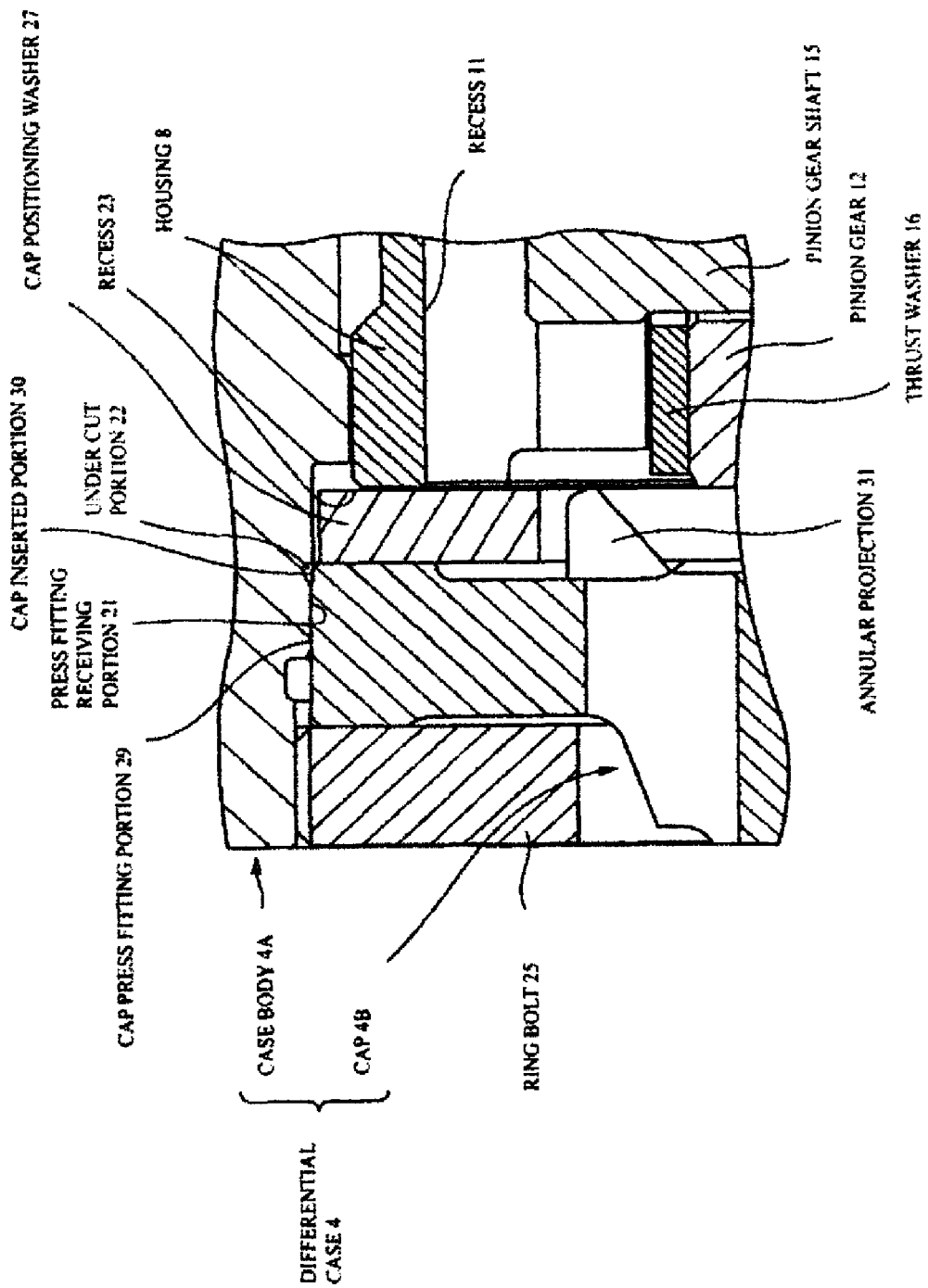
FIG. 4 is an oblique perspective diagram showing a main parts of a hybrid differential gear device according to one embodiment of the present invention.

As shown in FIG. 4, in an inner circumferential surface of the case body 4A are mounted annular press fitting receiving portions 21 fitting to an outer peripheral surface of the cap 4B and an ring-like under cut portion 22 of which inner diameter is larger than that of the press fitting receiving portion 21. The press fitting receiving portion 21 is located in a side of a ring bolt 25 of the case body 4A and the under cut portion 22 is located in a side of the press fitting portion of the cap 4B and these portions 21, 22 are aligned each other. And in the inner circumferential surface of the case body 4A are formed plural positioning recesses 23 opening to a side of the cap 4B and the tire shaft axis, that is the rotational axis O and being separated each 90 degrees in circumferential direction. The number of positioning recesses is four in the embodiment of the present invention and only one is shown in FIG. 4. The positioning recesses 23 are constructed to be fit to a positioning convex 27a of a cap positioning washer 27 to perform two functions of detent and movement restriction in a side of differential gear mechanisms. In an opening side of the case body 4A is formed an annular ring gear mounting flange 24 projecting perpendicular to the rotational axis O along the circumferential direction in a body.

The ring gear mounting flange 24 has a bolt mounting hole 24A opening to both sides of the flange to mount a ring gear, not shown, receiving a torque from the engine through an unillustrated driving pinion. On the opening portion of the case body 4A is mounted a ring bolt 25 through which a boss portion of the cap 4B is penetrated.

The ring bolt 25 is screwed movably in advancing and retracting in engaging with the inner peripheral surface of the case body 4A in order to fix the cap 4B to the tire shaft axis, that is the axis of the tire shaft inserted hole 19.

On the other hand, the cap 4B is fixed in press fitting into the case body 4A until the cap 4B is positioned at a step of the inner peripheral surface of the case body 4A by the positioning washer 27 to a press fitting direction and around the tire shaft axis. A left front tire shaft of the unillustrated right and left front tire shafts is inserted into the tire shaft inserted hole 26.

Figure 6:
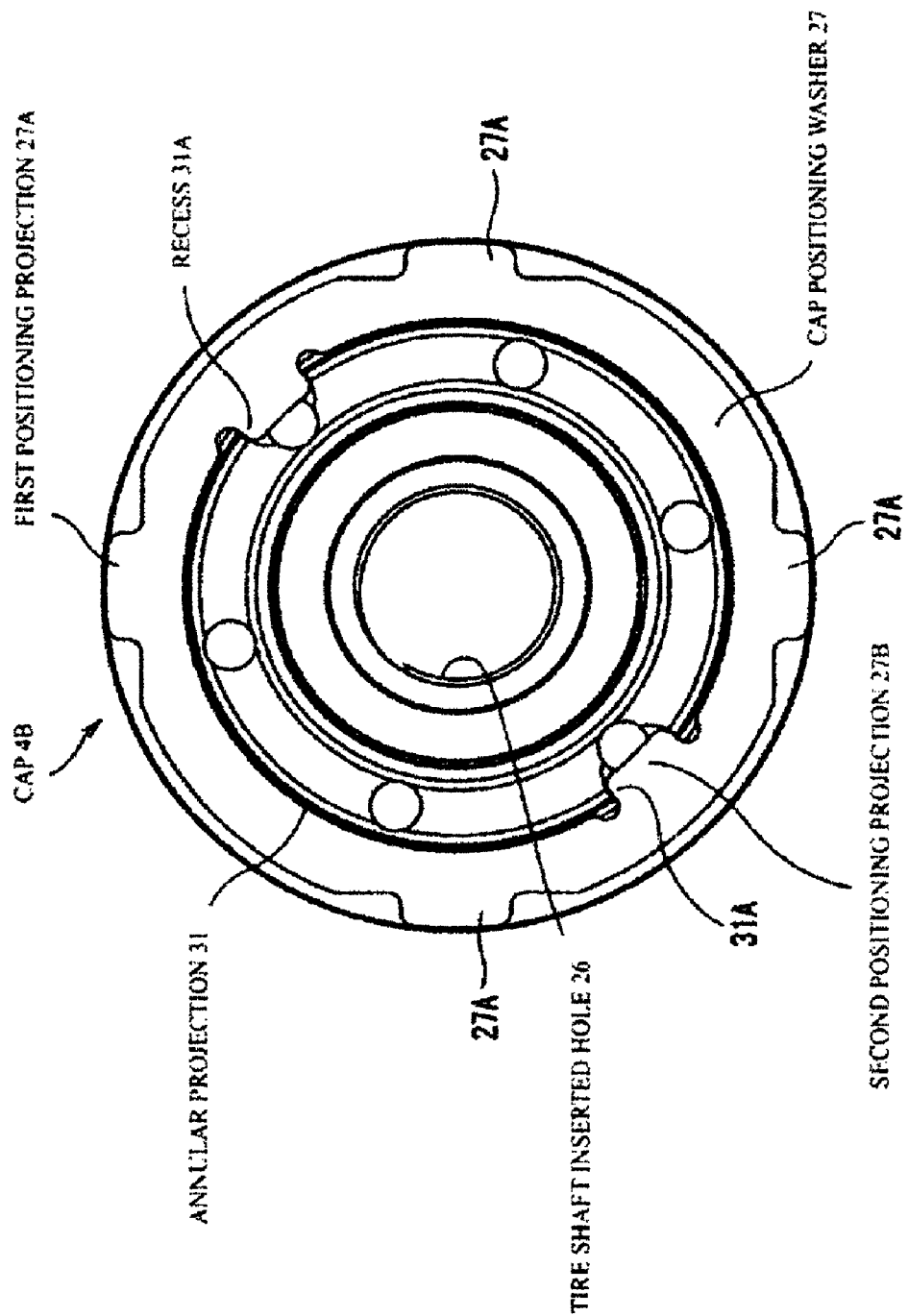
FIG. 6 is a cross sectional drawing showing a positioning stage of a cap against a cap positioning member of a hybrid differential gear device according to one embodiment of the present invention.

On one portion of an outer surface of the cap 4B are mounted a cap press fitting portion 29 fitting to an inner surface of the case body 4A, that is the press fitting receiving portion 21, and are mounted an cap inserted portion 30 which is not press-fitted to the inner surface of the case body 4A. The cap press fitting portion 29 and the cap inserted portion 30 are mounted next to each other to the direction of the tire shaft axis, and the cap press fitting portion 29 is located at a side of the outer end portion of the cap 4B and the cap inserted portion 30 is positioned at a side of the inner end portion of the cap 4B to a cap inserting direction explained hereinafter. On an inner end face of the cap 43 is mounted an annular projection 31, as shown in FIG. 6, 7, along the circumferential area of the side gear 14L. On the projection 31 are mounted plural recesses 31A positioned at predetermined distance of 180 degrees circumferentially and a number of the plural recesses is two in this one embodiment.

Figure 5:
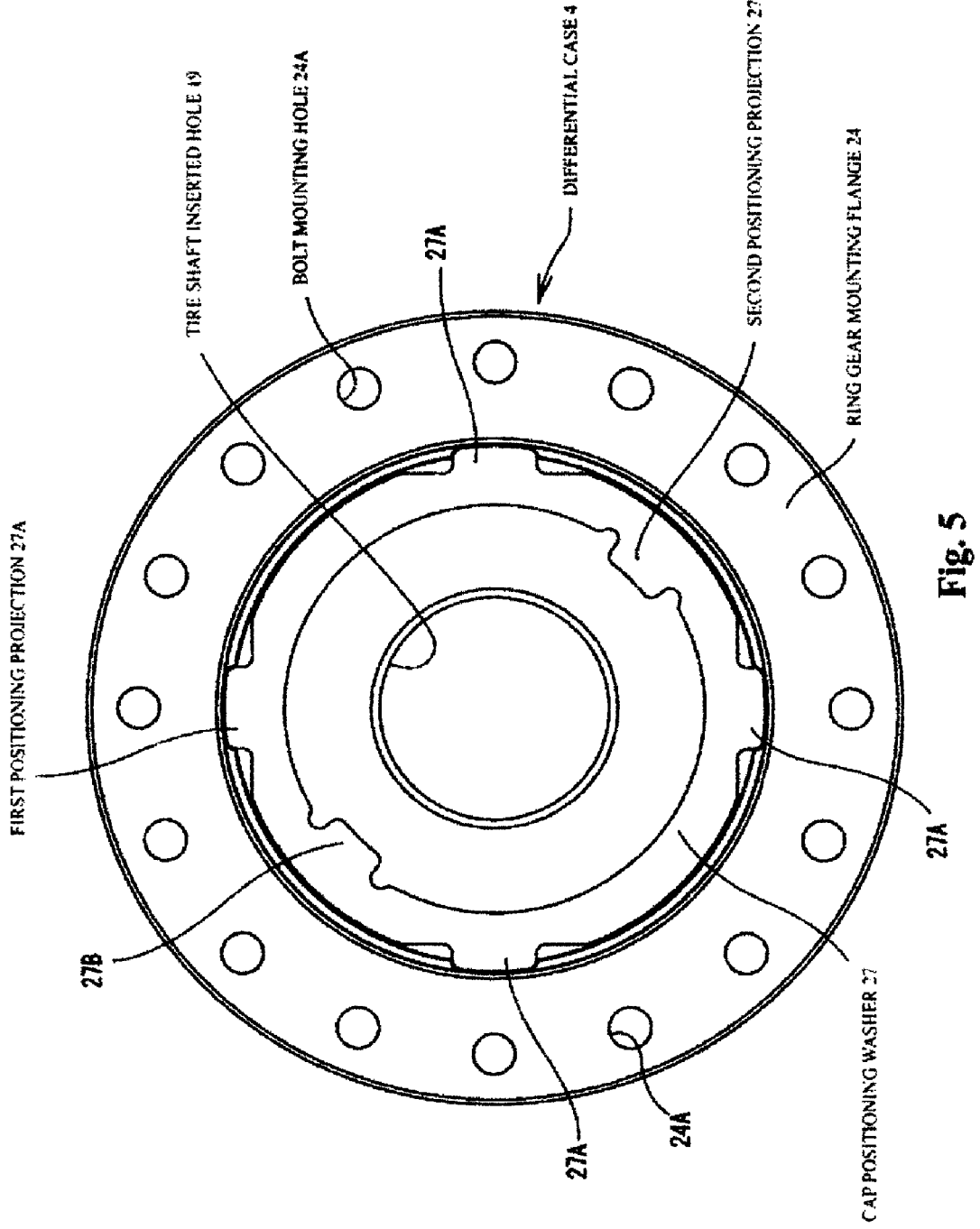
FIG. 5 is a cross sectional drawing showing a positioning stage of a cap positioning member against a case body of a hybrid differential gear device according to one embodiment of the present invention.

A cap positioning washer 27 has plural first positioning projections 27A as shown in FIG. 5, 6, each of which fits to each of positioning recesses 23 of the case body 4A, and also has plural second positioning projections 27B, each of which fits to each of recesses 31A of the projection 31. The cap positioning washer 27 is inserted into the case body 4A to be positioned along the inserting direction and around the tire shaft axis between the cap 4B and the housing 8 of the internal gear 7. The cap positioning washer 7 is constructed to be almost annular as a whole.

Operation of the Hybrid Differential Gear Device

Where the torque from the engine of the vehicle is input into the differential case 4 through the drive pinion and the ring gear, the differential case 4 is rotated around the rotational axis O. Upon the rotation of the differential case 4, the rotational force is transmitted to the planetary gears 5 thereafter to the sun gear 6 and the internal gear 7 through the planetary gears 5. Thereby, the sun gear 6 and the internal gear 7 are rotated in a body to transmit the rotational force to the pinion gears 12, 13 through the housing 8 and the pinion shafts 15. Thereby, the pinion gears 12, 13 are rotated to transmit the rotational force to the side gears 14R, 14L.

In this instance, because the sun gear 6 is engaged in spline with the hollow cylindrical shaft for connecting to the rear tire wheel and the side gears 14R, 14L are respectively engaged in spline with right and left front tire wheel shafts, the torque from the engine is transmitted to the hollow cylindrical shaft through the drive pinion, the ring gear, the differential case 4, the planetary gears 5 and the sun gear 6 of the first differential gear mechanism 2, and is transmitted to the right and left front tire shafts through the differential case 4, the planetary gears 5 and the internal gear 7 of the first differential gear mechanism 2, the pinion gears 12, 13 and the side gears 14R, 14L of the second differential gear mechanism 3.

Where the vehicle is driven in constant velocity on the straight line, the torque or the rotational force is transmitted to the sun gear 6 and the internal gear 7 through the planetary gears 5 to rotate the sun gear 6 and the internal gear 7 in constant velocity. The rotational force of the sun gear 6, not of the internal gear 7, is received to the hollow cylindrical shaft of the rear tire shaft to rotate the rear tire shaft. The pinion gears 12, 13 are not rotated by themselves but are rotated in planetary movement on the side gears 14R, 14L to be received the rotational force through the housing 8 and the pinion shafts 15, thereby to rotate the pinion gears 12, 13 and the side gears 14R, 14L in a body with the differential case 4. Thereby, the torque from the engine is evenly transmitted to the right and left tire wheel shafts of the front and rear sides to rotate in same revolution speed the right and left tire wheel shafts of the front and rear sides.

On the other hand, where the vehicle turns to the left direction in driving or the right front tire wheel is stuck in a muddy road, the torque is differentially distributed to the second differential gear mechanism 3 and the hollow cylindrical shaft of the rear tire shaft through the first differential gear mechanism 2. Moreover, the pinion gears 12, 13 are rotated by themselves on the side gears 14R, 14L to distribute the rotational force differentially to the right tire wheel and the left tire wheel of the front tire shafts in the second differential gear mechanism 3. Thereby, the left front tire wheel, the right and left rear tire wheels are rotated at slower velocity than the velocity of the differential case 4, on the other hand, the right front tire wheel is rotated at higher velocity than the velocity of the differential case 4.

In this hybrid differential gear device 1 of the one embodiment of the present invention, where the rotational force of the differential case 4 is transmitted to the sun gear 6 and the internal gear 7 through the planetary gears 5, the thrust force is generated on the sun gear 6 and the internal gear 7 to the direction of the tire shaft axis because these gears 5, 6, 7 are the helical gears to be formed their gear faces in incline. The thrust force S1, S2 is generated in dependent on a running stage of the vehicle or an inclined degree of the helical gear, thereby moving the sun gear 6 and the internal gear 7 in approaching each other. And also the rotational force of the internal gear 7 is transmitted to the side gears 14R, 14L through the pinion gear shafts 15 and the pinion gears 12, 13 to generate the thrust force S3 on the side gears 14R, 14L, thereby intending to move separately the side gears 14R, 14L each other. However, since the pinion gear shafts 15 are supported movably to the tire shaft axis direction against the internal gear 7 according to the guided pair of flat portions 15a, the right side gear 14R does not receive the load based on the thrust force S2 from the pinion gear shafts 15 through the pinion gears 12, 13 because the pinion gear shafts 15 are moved to absorb the load. That is to say, the pinion gears 12, 13 and the side gears 14R, 14L are maintained in good engagement each other because the pinion gear shafts 15 are moved to the equal distance position from the right side gear 14R and the left side gear 14L, and the thrust force S1 on the sun gear 6 is received by the internal gear 7 and the right side gear 14R. The thrust force S1 is absorbed into the internal gear 7 and the side gear 14R because the resultant force of the thrust force S2 and S3 is larger than the thrust force S1.

Therefore, the hybrid differential device and the differential case therefor of the present invention take effects as follows;

1. Since the pinion gear shaft 15 is supported movably against the internal gear 7 to the direction of the tire shaft axis, the thrust force S1 generated on the sun gear 6 is absorbed into the internal gear 7 and the side gear 14R in the stage of maintaining the good engagement between the pinion gears 12, 13 and the side gears 14R, 14L. Thereby, there is no need of the wall which is needed in the prior art so that it is shortened the width of the differential case along the rotational axis direction to achieve to make the device as a whole to be small and light.
2. Since the pinion shafts 15 are movable against the internal gear 7 to the tire shaft axis direction, the assembling error is absorbed to achieve to make the assembling work to be simple.
3. Since in the case body 4A only is formed the ring gear mounting flange 24 mounting the ring gear to the differential case 4, the width of the ring gear mounting flange 24 and the length of the bolt mounting hole 24A to the tire shaft axis direction can be set to be longer to make a mechanical strength of the ring gear mounting flange 24 and a mounting strength of the ring gear to the ring gear mounting flange 24 to be high.
4. Since the cap inserting portion 30 is located next to the cap press fitting portion 29 to the cap inserting direction, the recess 31A of the projection 31 fitting to the second positioning projection 27B of the cap positioning washer 27 can be located at the location next to the cap press fitting portion 29. Thereby, the length of the second positioning projection 27B of the cap positioning washer 27 to the tire shaft axis direction can be shortened to be able to set a smaller width of the cap positioning washer 27.

Assembling Method of One Embodiment of the Present Invention

Next it will be explained the assembling method of the differential case of the one embodiment of the present invention hereinafter according to FIGS. 4, 5, 6. The assembling method of the differential case of the one embodiment of the present invention is executed in accordance with a sequence of steps of "positioning of the washer for positioning the cap", "positioning of the cap" and "fixing of the cap".

Next is explained after it is finished to install all of the parts of the first differential gear mechanism 2 and the second differential gear mechanism 3 into the case body 4A of the differential case 4.

Positioning of the Cap Positioning Washer

As shown in FIG. 5, the cap positioning washer 27 is inserted into the case body 4A through the opening of the case body 4A and the first positioning projection 27A of the cap positioning washer 27 is engaged with the positioning recess 23 of the case body 4A. Based on that the first positioning projection 27A of the cap positioning washer 27 is engaged with the positioning recess 23 of the case body 4A, the cap positioning washer 27 is positioned against the end face of the internal gear 7 of the first differential gear mechanism 2 in order to be positioned against the case body 4A around the tire shaft axis Positioning of the Cap As shown in FIG. 6, after the recess 31A is engaged with the second positioning projection 27B of the cap positioning washer 27 of the case body 4A, the cap 4: is inserted in press fitting into the case body 4A through its opening along the rotational axis O. Where the cap 4B is located in the case body 4A, the end face of the cap positioning washer 27 contacts with the end face of the cap 4B before in press fitting in order that the cap 4B is positioned against the second positioning projection 27B of the cap positioning washer 27 around the rotational axis. And after the cap 4B is inserted into the case body 4A, the cap 4B is positioned against the cap positioning end face in case body 4A to the inserting direction along the rotational axis.

Fixing of the Cap

As shown in FIG. 4, into the central opening of the ring bolt 25 is inserted the boss portion of the cap 4B positioned against the cap positioning washer 27 around the tire shaft axis and also positioned against the cap positioning end face in the case body 4A to the inserting direction in order to screw the ring bolt 25 into the inner opening surface of the case body 4A. Where the ring bolt 25 is screwed into the inner opening surface of the case body 4A, the cap 4B is positioned in opposite direction to the inserting direction in press fitting to the cap positioning end face in the case body 4A so that the cap 4B is fixed to the direction of the tire shaft axis, that is the rotational axis and around the tire shaft axis.

Finally the differential case for the vehicle is assembled.

Therefore, the assembling method of the differential case of the present invention takes effects as follows;

5. Since the cap 4B having the tire wheel shaft inserted hole 26 is positioned in press fitting in the case body 4A, the axis of the tire wheel shaft inserted hole 26 can be coincided in high accuracy with the tire wheel shaft inserted hole 29 of the case body 4A.
6. The cap 4B and the ring bolt 25 can receive positively the force intending to spread the differential case 4 to the direction of the tire shaft axis when the force is generated at the torque transmission in the first differential gear mechanism 2 and the second differential mechanism 3. Therefore, since the shifting amount between an acting portion of the spreading force on the cap 4B and connecting portions of the cap 4B and the ring bolt 25, which are received the spreading force, with the case body 4A is very small, it can make a stiffness of the differential case 4 to be high.

7. Because only one ring bolt 25 achieves to position the cap 4B both to the inserting direction and the opposite to the inserting direction, it can be easy to assemble and it can be positive to receive the force from the cap 4B in good balance to the peripheral direction.

Second Embodiment of the Present Invention

Figure 7:
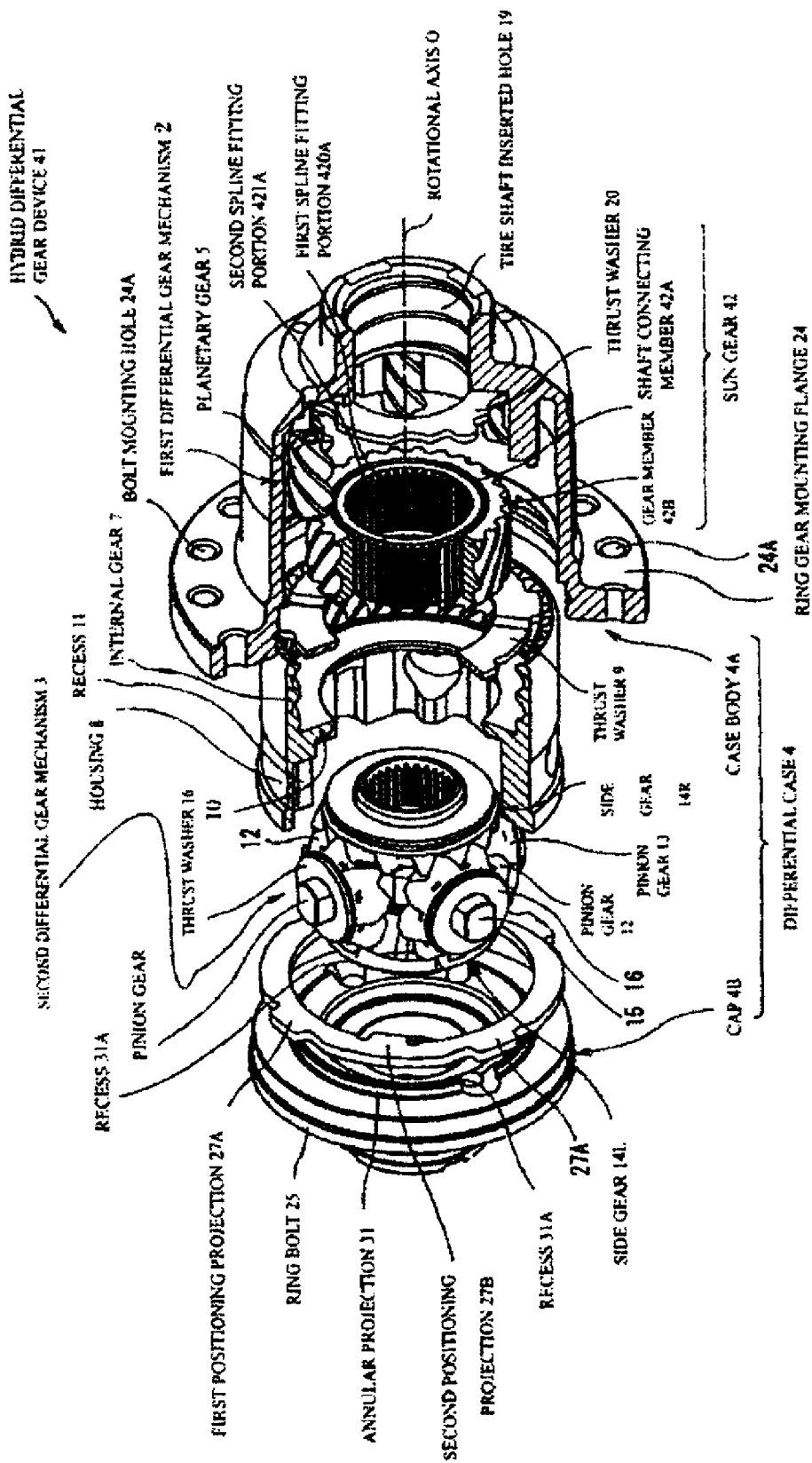
FIG. 7 is an oblique perspective diagram explaining a hybrid differential gear device according to second embodiment of the present invention.
Figure 8:
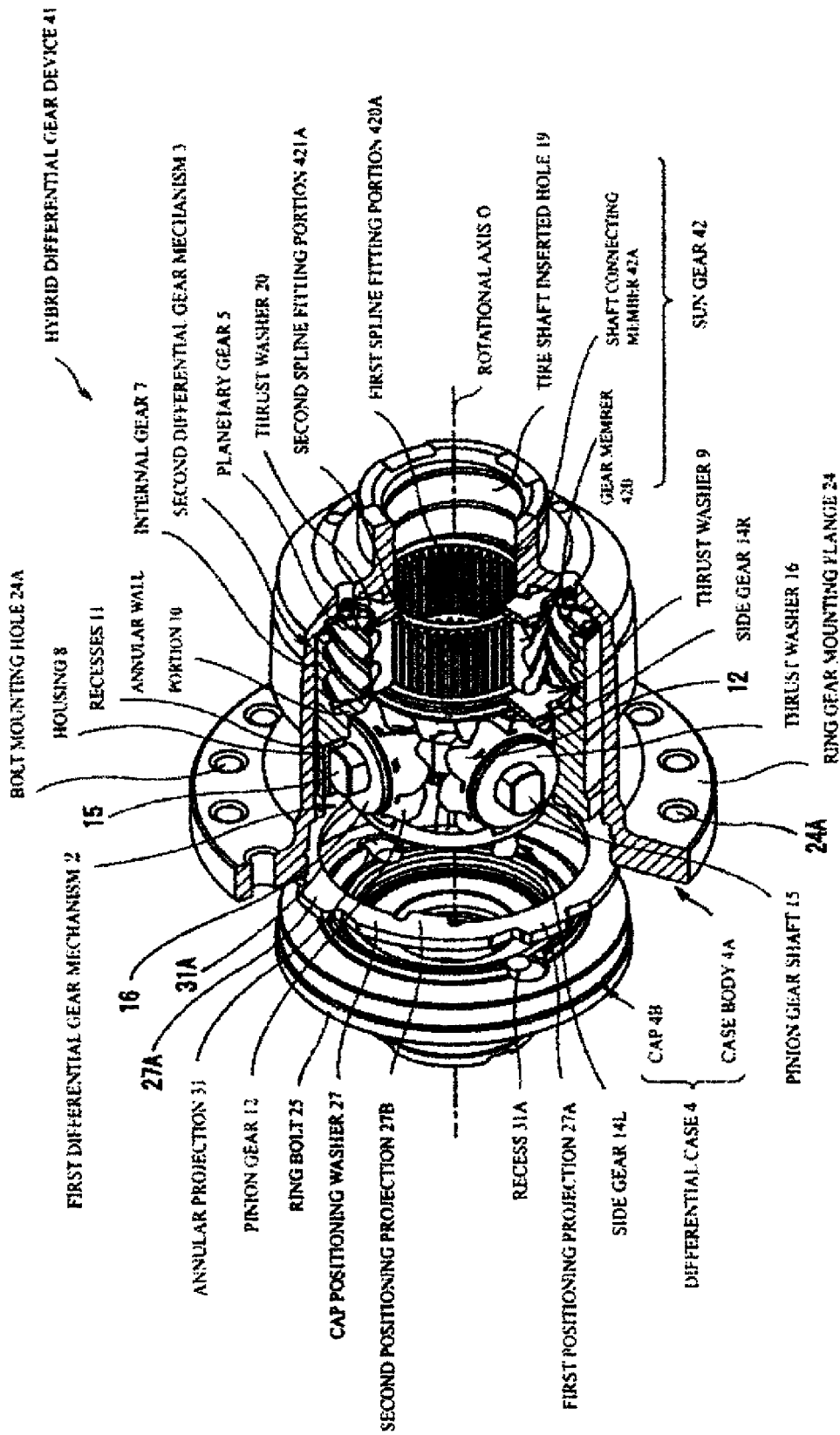
FIG. 8 is an oblique perspective diagram showing an engaging stage of gears of a hybrid differential gear device according to second embodiment of the present invention.
Figure 9:
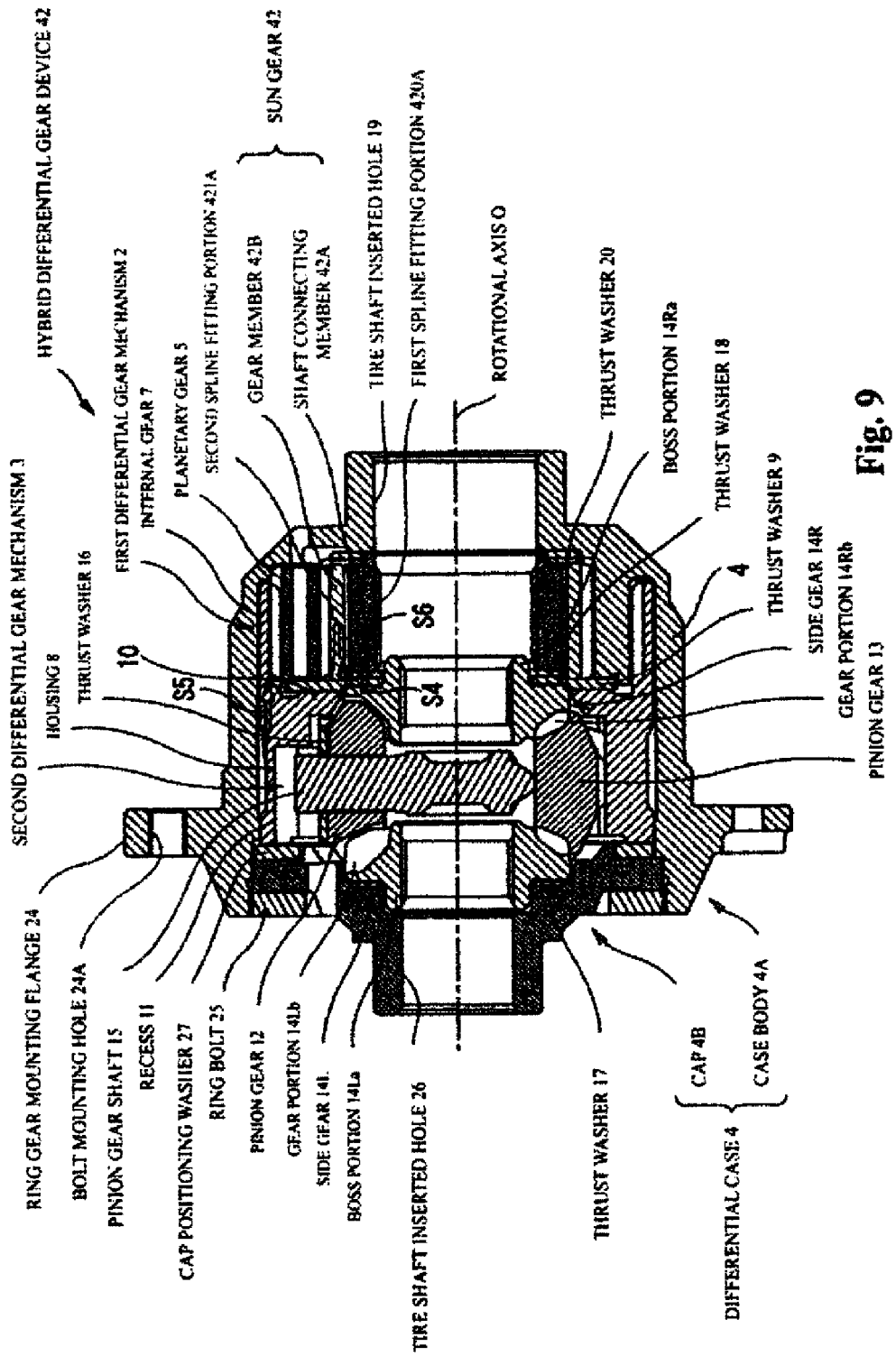
FIG. 9 is a cross sectional drawing explaining a hybrid differential gear device according to second embodiment of the present invention.

As shown in FIG. 7 to FIG. 9, the hybrid differential gear device 41 of the second embodiment of the present invention equips a sun gear 42, in replacement of the sun gear 6, comprising a shaft connecting member 42A receiving thrust force S4 from the right side gear 14R, and a gear member 42B receiving thrust force S5 from the internal gear 7.

In order to receive the thrust force S4, the shaft connecting member 42A has a first spline fitting portion 420A connecting in its inner surface with an unillustrated hollow cylindrical shaft for connecting with the rear tire shaft movably to the tire shaft axis direction, and a second spline fitting portion 421A in its outer surface with the gear member 42B movably in the tire shaft axis direction. The shaft connecting member 42A is placed on the rotational axis O of the differential case 4 and is constructed to be a hollow cylindrical body as a whole.

The gear member 42B is engaged with the planetary gear 5 and is a hollow cylindrical body having a larger inner diameter than an outer diameter of the shaft connecting member 42A. The thrust washer 9 is inserted between an opening end face of the gear member 42B in a side of the housing and a side face of the wall 10 in a side of the sun gear.

The operation of the second embodiment of the hybrid differential gear device 41 will be explained hereinafter. As shown in FIG. 9, the rotational force of the differential case 4 is transmitted to the gear member 42 B of the sun gear 42 and the internal gear 7 through the planetary gear 7 to generate the thrust force S6, S5 respectively on the gear member 42B and the internal gear 7. Thereby, the gear member 42B and the internal gear 7 are moved in the direction approaching each other along the rotational axis O so that the pinion gear shafts 15 are moved with the internal gear 7 to the sun gear side. And the rotational force of the internal gear 7 is transmitted to the side gears 14R, 14L through pinion gear shafts 15 and the pinion gears 12, 13 to generate the thrust force S4 on the side gear 14R, 14L so that the side gears 14R, 14L are moved to the direction separating each other. In this case, because the pinion gear shafts 15 are supported movably in the tire shaft direction against the internal gear 7, the right side gear 14R does not receive the load from the pinion gear shafts 15 through the pinion gears 12, 13. Therefore, the thrust force S6 generated on the side gear member 42B of the sun gear 42 is received by the internal gear 7 and the thrust force S6 is absorbed by the internal gear 7.

The second embodiment of the present invention takes same effects to effects 1. and 2. of the first embodiment of the present invention.

While the invention has been described in detail with reference to the preferred embodiments, it will be apparent to those skilled in the art that the invention is not limited to the present embodiments, and that the invention may be realized in various other embodiments within the scope of the claims.

While the embodiments of the present invention are described that the first input element is the planetary gear 5, the first output element is the sun gear 6 and the second output element is the internal gear 7, however, it may be possible that the first input member is a planetary gear, the first output element is an internal gear and the second output element is a sun gear. And it may be possible that the first input element is a sun gear, the first output element is an internal gear or a planetary gear and the second output element is a planetary gear or an internal gear, it may be also possible that the first input gear is an internal gear, the first output element is a sun gear or a planetary gear and the second output element is a planetary gear or a sun gear. That is to say, the input element is selected from the group of the first element, the second element and the third element and the remaining other two elements are respectively the first output element and the second element where the first element is the internal gear, the second element is the sun gear and the third element is the planetary gear.

Figure 10:
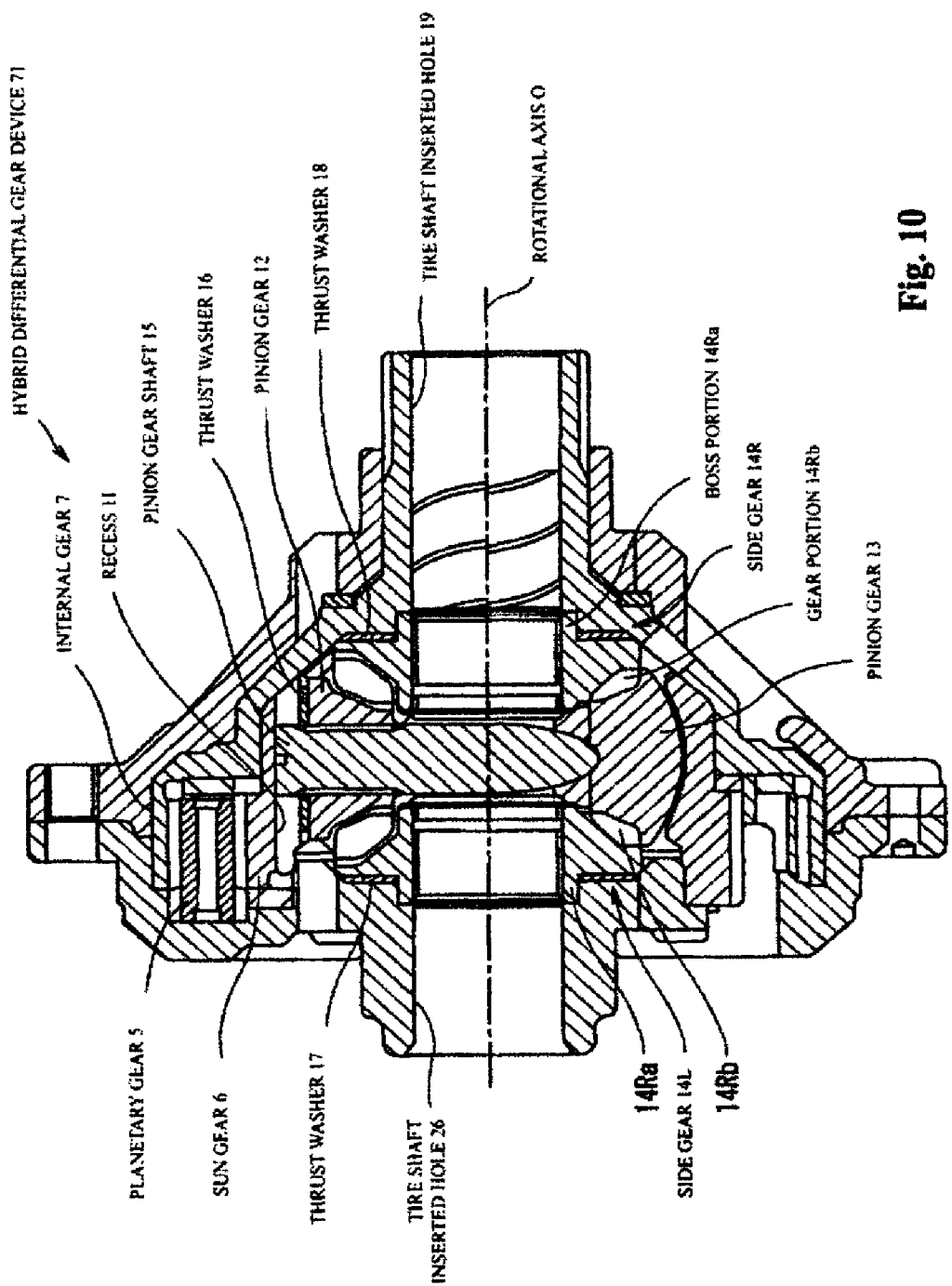
FIG. 10 is a cross sectional drawing explaining a hybrid differential gear device according to other embodiment of the present invention.

While the embodiments of the present invention are described that the first differential gear mechanism 2 and the second differential mechanism 3 are placed in parallel in the rotational axis direction but the first differential gear mechanism 2 and the second differential mechanism 3 may be placed in parallel in the perpendicular direction to the rotational axis, as shown in FIG. 10. In this case, the planetary gear 5 performs the function of the first input element, the internal gear 7 does that of the first output element and the sun gear 6 does that of the second output element. The pinion shafts 15 is supported non-rotatably against the sun gear 6 and movably in the tire wheel shaft direction.

While the embodiments of the present invention are described that the first differential gear mechanism 2 and the second differential mechanism 3 of the hybrid differential gear device 1, 41 are described as the center differential mechanism and the front differential mechanism respectively, but it may be the hybrid differential device of the center differential mechanism and the rear differential mechanism.

While the embodiments of the present invention are described that the pinion gear engaging with the side gears 14R, 14L are two pair of pinion gears 12, 13, but it may be one pair of pinion gear.

While the embodiments of the present invention are described that the differential case 4 comprises two pieces of the case body 4A and the cap 4B, but the differential case may be one piece or three pieces.

While the embodiments of the present invention are described that the cap 4B is positioned by using the cap positioning washer 27, the other member can be replaced for the cap positioning washer 27 in order to position the cap 4B. And also, where a spline fitting portion is formed on an inner peripheral surface of the case body, the cap 4B may be positioned by the spline fitting portion. In this case the assembling method of the differential case will be performed that the cap is positioned around the tire shaft against the case body, after that, the cap is press-fit to the tire shaft direction to be positioned in the press fit direction. Then, the ring bolts are screwed into the case body to position the cap to the opposite direction to the press fit direction in order to fix the cap to the tire shaft direction.

What is claimed is:

1. A hybrid differential gear device comprising:
a first differential gear mechanism distributing driving force from a vehicle to a front tire wheel side and a rear tire wheel side, said first differential gear mechanism including an internal gear as a first element, a sun gear as a second element having an axis the same as an axis of said internal gear, plural planetary gears as a third element disposed between said sun gear and said internal gear,
one element selected from the group of said first element, said second element and said third element is an input element and the remaining elements are respectively a first output element and a second output element;

a second differential gear mechanism distributing said distributed driving force by said first differential gear mechanism to a right tire wheel and a left tire wheel in said front tire wheel side or said rear tire wheel side;

said second differential gear mechanism including a pair of side gears connecting respectively to said right tire wheel and said left tire wheel in said front tire wheel side or said rear tire wheel side, at least one pair of pinion gears engaging with said one pair of side gears, and a plurality of pinion gear shafts rotatably supporting said one pair of pinion gears; and a differential case housing said first differential gear mechanism and said second differential gear mechanism;

said pinion gear shafts are supported non-rotatably and movably along a rotational axis of said differential case against one of said first output element and said second output element.

2. The hybrid differential gear device according to claim 1, wherein said first differential gear mechanism and said second differential gear mechanism are disposed in parallel to each other in a direction of the rotational axis of said differential case.

3. The hybrid differential gear device according to claim 1, wherein said first differential gear mechanism and said second differential gear mechanism are disposed in parallel to each other in a direction perpendicular to the rotational axis of said differential case.

4. The hybrid differential gear device according to claim 1, wherein a movable distance of said plural pinion gear shafts against said one of said output elements in a direction of the rotational axis of said differential case is larger than a movable distance of said one of said output elements against said differential case in said direction of said rotational axis.

5. The hybrid differential gear device according to claim 1, wherein a resultant force resulting from a thrust force generated on said one of said output elements and a thrust force generated on one side gear of said pair of side gears is larger than a thrust force generated on the other output element of said first output element and said second output element.

6. The hybrid differential gear device according to claim 1, wherein a movable distance of said plural pinion gear shafts against said one of said output elements in a direction of the rotational axis of said differential case is larger than a half of a movable distance of said one of said output elements against said differential case in said direction of said rotational axis.

7. The hybrid differential gear device according to claim 1, wherein the other output element of said first output element and said second output element includes a shaft connecting member receiving thrust force from one of said pair of side gears, and a gear member receiving thrust force from said one of said output elements.

8. The hybrid differential gear device according to claim 1, wherein said internal gear, said sun gear and said planetary gears respectively comprise a helical gear.

9. The differential case for said hybrid differential gear device according to claim 1, wherein said differential case comprises:

a case body having a first tire wheel shaft inserted hole and a ring gear mounting flange;

a cap press fitted into said case body and positioned in a direction of press fitting and around the rotational axis of said differential case, said cap has a second tire wheel shaft inserted hole; and a ring bolt fixing said cap by positioning said cap in a direction opposite to said direction of press fitting, said ring bolt is screwed in engagement with said case body.

10. The differential case for said hybrid differential gear device according to claim 9, wherein said cap has a first peripheral portion in an outer end portion of said cap and a second peripheral portion in an inner end portion of said cap, said first peripheral portion is press fitted into an inner surface of said case body, said second peripheral portion is mounted but not press fitted into said inner surface of said case body, and said first and said second peripheral portions are installed next to each other.

11. The differential case for said hybrid differential gear device according to claim 10, wherein said differential case further comprises a cap positioning member inserted into said differential case to be positioned in an inserting direction and around the rotational axis of said differential case, said case body having a first positioning portion positioning said cap positioning member in said inserting direction and around said rotational axis of said differential case, said cap positioning member having a second positioning portion positioning said cap around said rotational axis of said differential case.

12. An assembling method of said differential case for said hybrid differential gear device according to claim 9, wherein said assembling method comprising the steps of:

positioning said cap having said second tire wheel shaft inserted hole against said case body having said first tire wheel shaft inserted hole and said ring gear mounting flange in said direction of press fitting and around said rotational axis of said differential case by way of press fitting said cap into said case body;

fixing said cap in a direction opposite to a direction of said inserting by way of screwing said ring bolt into said case body.

13. The assembling method of said differential case according to claim 12, wherein said step of positioning said cap is divided into the steps of:

positioning a cap positioning member against said case body having said first tire wheel shaft inserted hole and said ring gear mounting flange in said direction of press fitting and around said rotational axis of said differential case by way of inserting said cap positioning member into said case body;

positioning said cap having said second tire wheel shaft inserted hole against said case body in said direction of press fitting and around said rotational axis of said differential case by way of press fitting said cap into said case body.

14. A hybrid differential gear device comprising:

a planetary gear type differential gear mechanism distributing driving force from a vehicle to a front tire wheel side and a rear tire wheel side;

a bevel gear type differential gear mechanism distributing said distributed driving force by said planetary gear type differential gear mechanism to a right tire wheel and a left tire wheel in said front tire wheel side or said rear tire wheel side; and a differential case housing said planetary gear type differential gear mechanism and said bevel gear type differential gear mechanism;

said bevel gear type differential gear mechanism including a pair of side gears connecting respectively to said right tire wheel and said left tire wheel in said front tire wheel side or said rear tire wheel side, at least one pair of pinion gears engaging with said one pair of side gears, and a plurality of pinion gear shafts rotatably supporting said one pair of pinion gears;

said pinion gear shafts are supported non-rotatably and movably along the rotational axis of said differential case against an output element of said planetary gear type differential gear mechanism.

15. The differential case for said hybrid differential gear device according to claim 14, wherein said differential case comprising:
- a case body having a first tire wheel shaft inserted hole and a ring gear mounting flange installed on a peripheral surface of said differential case;
- a cap positioning member inserted into said differential case to be positioned in an inserting direction and around the rotational axis of said differential case;
- a cap press fitted into said case body and positioned in a direction of press fitting and around the rotational axis of said differential case by said cap positioning member, said cap has a second tire wheel shaft inserted hole; and
- a ring bolt fixing said cap by positioning said cap in a direction opposite to said direction of press fitting, said ring bolt is screwed in engagement with said case body.

16. The differential case for said hybrid differential gear device according to claim 15, wherein said cap positioning member comprises a washer installed between said cap and said bevel gear type differential gear mechanism.

* * * * *